(12) United States Patent
Liu et al.

(10) Patent No.: US 11,030,202 B2
(45) Date of Patent: Jun. 8, 2021

(54) METHOD AND DEVICE FOR RECOMMENDATION OF MEDIA CONTENT

(71) Applicant: Tencent Technology (Shenzhen) Company Limited, Shenzhen (CN)

(72) Inventors: Lichun Liu, Shenzhen (CN); Jingtao Zhu, Shenzhen (CN); Xiang Wang, Shenzhen (CN); Chentao Fan, Shenzhen (CN); Bin Zhou, Shenzhen (CN); Shenyuan Li, Shenzhen (CN); Jianfeng Chen, Shenzhen (CN); Siliang Huang, Shenzhen (CN); Juan Sun, Shenzhen (CN); Huguang Jin, Shenzhen (CN); Dan Li, Shenzhen (CN); Chunxia Qin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 167 days.

(21) Appl. No.: 16/421,213

(22) Filed: May 23, 2019

(65) Prior Publication Data

US 2019/0278778 A1    Sep. 12, 2019

Related U.S. Application Data

(63) Continuation of application No. 14/589,086, filed on Jan. 5, 2015, now Pat. No. 10,346,412, which is a
(Continued)

(30) Foreign Application Priority Data

Aug. 28, 2012    (CN) .................... 201210309267.X (51) Int. Cl.
*G06F 16/2457* (2019.01)
*G06F 16/9535* (2019.01)
(Continued)

(52) U.S. Cl.
CPC ...... *G06F 16/24578* (2019.01); *G06F 16/435* (2019.01); *G06F 16/9535* (2019.01); *H04N 21/251* (2013.01)

(58) Field of Classification Search
None
See application file for complete search history.

(56) References Cited

U.S. PATENT DOCUMENTS 8,370,348 B1    2/2013  Reilly et al.
8,375,073 B1    2/2013  Jain
(Continued)

FOREIGN PATENT DOCUMENTS

CN    101984437 A    3/2011
CN    102043781 A    5/2011
CN    102236669 A    11/2011

OTHER PUBLICATIONS

Tencent Technology, ISRWO, PCT/CN2013/080401, Nov. 7, 2013, 11 pgs.
(Continued)

*Primary Examiner* — Irene Baker
(74) *Attorney, Agent, or Firm* — Morgan, Lewis & Bockius LLP (57) ABSTRACT

A method and a device for recommendation of media content are described. The method includes: calculating scores of media content labels in a computer media content library; in descending order of the scores, selecting a first threshold media content label as a candidate media content label; for the candidate media content label, finding out a media content corresponding to the candidate media content label from the media content library; for the media content corresponding to the candidate media content label, in descending order of the amount of page views, selecting a second threshold media content as a media content to be recommended corresponding to the candidate media content
(Continued)

label; and recommending the media content to be recommended corresponding to the candidate media content label to a user. The method and device can recommend popular media contents to users, and reduce the style difference between the media contents.

12 Claims, 4 Drawing Sheets

Related U.S. Application Data continuation of application No. PCT/CN2013/080401, filed on Jul. 30, 2013.

(51) Int. Cl.
*H04N 21/25* (2011.01)
*G06F 16/435* (2019.01)

(56) References Cited

U.S. PATENT DOCUMENTS

| | | | | |
|---|---|---|---|---|
| 8,924,376 | B1* | 12/2014 | Lee | G06F 16/951 707/723 |
| 10,152,721 | B2 | 12/2018 | O'Sullivan et al. | |
| 2003/0110181 | A1 | 6/2003 | Schuetze et al. | |
| 2003/0195877 | A1 | 10/2003 | Ford et al. | |
| 2006/0195440 | A1* | 8/2006 | Burges | G06F 16/9535 |
| 2008/0235216 | A1* | 9/2008 | Ruttenberg | G06Q 30/02 |
| 2009/0006374 | A1 | 1/2009 | Kim et al. | |
| 2011/0029636 | A1 | 2/2011 | Smyth et al. | |
| 2011/0258196 | A1 | 10/2011 | Lepsoy et al. | |
| 2012/0102410 | A1* | 4/2012 | Gewecke | G06F 16/435 715/738 |
| 2012/0254074 | A1 | 10/2012 | Flinn et al. | |
| 2013/0097101 | A1* | 4/2013 | Ortiz | G06Q 30/02 706/11 |
| 2013/0166350 | A1 | 6/2013 | Wellemain et al. | |
| 2013/0218905 | A1 | 8/2013 | Sankarasubramaniam et al. | |
| 2013/0268261 | A1 | 10/2013 | Kim et al. | |
| 2013/0275416 | A1* | 10/2013 | Thomson | G06Q 10/06 707/723 |
| 2014/0006415 | A1* | 1/2014 | Rubchinsky | G07C 13/00 707/748 |
| 2017/0124074 | A1* | 5/2017 | Cama | G06F 16/437 |

OTHER PUBLICATIONS

Tencent Technology, IPRP, PCT/CN2013/080401, Mar. 3, 2015, 10 pgs.
Wikipedia. "Logarithmic Scale" Oct. 10, 2011. Wikipedia via Archive.org URL link: https:/Web.archive.org/web/20111010215440/http://en.wikipedia.org/wiki/Logarithmic_scale. Access Mar. 2018.
Office Action Issued in Corresponding Chinese Application No. 201210309267.X, dated Aug. 3, 2015.

\* cited by examiner

METHOD AND DEVICE FOR RECOMMENDATION OF MEDIA CONTENT

CROSS REFERENCE TO RELATED APPLICATIONS

The present application is a continuation of U.S. application Ser. No. 14/589,086, entitled "METHOD AND DEVICE FOR RECOMMENDATION OF MEDIA CONTENT" filed on Jan. 5, 2015, which is a Continuation Application of PCT Patent Application No. PCT/CN2013/080401, entitled "METHOD AND DEVICE FOR RECOMMENDATION OF MEDIA CONTENT" filed on Jul. 30, 2013, which claims the benefit of priority of China Patent Application No. 201210309267.X filed in the Chinese Patent Office on Aug. 28, 2012, and entitled "METHOD AND DEVICE FOR RECOMMENDATION OF MEDIA CONTENT", the content of which is hereby incorporated by reference in their entireties.

TECHNICAL FIELD

The present disclosure relates to a field of personalized recommendation technology, and more particularly to a method and a device for recommendation of media content.

BACKGROUND

Song personalized recommendation is one of the most popular applications in the current field of personalized recommendation. The range of listening songs can be enlarged by searching favorite songs for a user and recommending the songs to the user, and the user stickiness can be enhanced.

At present, the collaborative filtering recommendation method is generally used to recommend songs for the user, and does not need to obtain the characteristics of the user or the songs, but only depends on the user's past behaviors (such as browsing to the songs) to the songs. The feedbacks of the user on the songs can be collected in the form of scores, and the similarity degrees among the user behaviors will be calculated. The evaluation of neighbors with higher similarity degrees for other songs can be used to predict the degree of preference of a target user for a song to be recommended, and finally the song is recommended to the target user according to the degree of preference.

However, the collaborative filtering recommendation method at least has the problem that the styles of recommended songs are different, and the recommended songs may be less popular.

SUMMARY

Embodiments of the present invention provide a method and a device for recommendation of media content, which can be directed to reduce style differences of recommended media contents, and prevent unpopular media contents from being recommended.

According to a first aspect of the present invention, it is provided a computer-implemented method for recommendation of media content associated with a computing device, including: at the computing device having one or more processors and memory for storing program modules to be executed by the processors: calculating a score of a media content label in a media content library; selecting a first threshold media content label as a candidate media content label in descending order of the scores; finding out, according to the candidate media content label, a media content corresponding to the candidate media content label from the media content library; selecting, according to the media content corresponding to the candidate media content label, a second threshold media content as a media content to be recommended corresponding to the candidate media content label in descending order of amount of page views; and recommending the media content to be recommended corresponding to the candidate media content label to a user.

According to a second aspect of the present invention, it is provided a computing device for recommendation of media content, including: one or more processors; memory; and one or more program modules stored in the memory and to be executed by the processors, the one or more program modules further including instructions for: calculating a score of a media content label in a media content library; selecting a first threshold media content label as a candidate media content label in descending order of the scores; finding out, according to the candidate media content label, a media content corresponding to the candidate media content label from the media content library; selecting, according to the media content corresponding to the candidate media content label, a second threshold media content as a media content to be recommended corresponding to the candidate media content label in descending order of amount of page views; and recommending the media content to be recommended corresponding to the candidate media content label to a user.

Embodiments of the present invention may have the following benefit effects.

According to the embodiments of the present disclosure, after calculating scores of the media content labels in the media content library, a first threshold media content label can be selected as a candidate media content label in descending order of the scores, the media content corresponding to the candidate media content label can be found out from the media content library; further a second threshold media content can be selected as a media content to be recommended corresponding to the candidate media content label in descending order of page views, and then the media content to be recommended corresponding to the candidate media content label is recommended to a user. By this way, some popular media contents can be recommended to the user, and style difference between the media contents that are recommended to the user can be reduced effectively, thereby preventing the unpopular media content from being recommended to the user.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

The following in conjunction with the accompanying drawings according to various embodiments, clearly describes technical proposals according to various embodiments. It would be obvious that the described embodiments are part but not all of embodiments. All other embodiments obtained by persons having ordinary skills without paying any creative work based on the illustrated embodiments should all be within the protection scope according to various embodiments.

A method and a device for recommendation of media content are provided according to various embodiments of the invention, which can improve the accuracy of media contents that are recommended to a user, reduce style differences between the media contents, and prevent unpopular media contents from being recommend to the user, thereby greatly improving the experience of the user. Further descriptions of embodiments of the present invention will be illustrated are described in detail as below.

Figure 1:
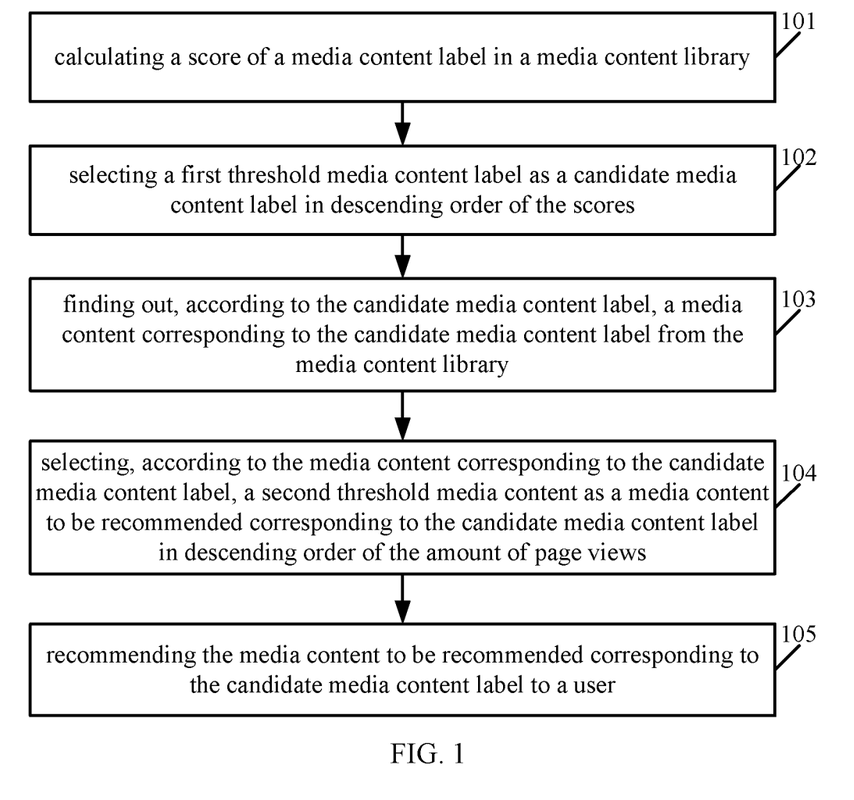
FIG. 1 is a flowchart of a method for recommendation of media content disclosed by one embodiment of the present invention.

Referring to FIG. 1, it is a flowchart of a method for recommendation of media content disclosed by one embodiment of the present invention. The method for recommendation of media content implemented by a computer associated with a computing device, at the computing device having one or more processors and memory for storing program modules to be executed by the processors. As shown in FIG. 1, the method for recommendation of media content starts from step S101.

Step S101: calculating a score of a media content label in a media content library.

In one embodiment, the media content library can be used for storing media content, such as songs, videos, audios, images, texts, etc. In other words, the media content in the media content library may be any one of the songs, the videos, the audios, the images and the texts, or a combination of two or more than two of the songs, the videos, the audios, the images and the texts.

A music file is taken here as an example of the media content, in a practical application, the music file may at least include 8 media content labels: namely, theme, mood, rhythm, melody, scene, timbre, musical instrument and genre. In other words, the score of each of the theme, the mood, the rhythm, the melody, the scene, the timbre, the musical instrument and the genre in the media content can be calculated separately in the step S101.

It should be noted that the 8 media content labels here are merely illustrative. The number of media content labels may not be 8 in practical applications, but not limited to 8, which will not be restricted here in embodiments of the present invention.

In an optional embodiment, the step S101 may specifically be implemented by the following sub-steps:

1) calculating, according to the media content label in the media content library, a ratio between the total amount of media contents containing the media content label and the amount of all media contents in the media content library to obtain a heat degree of the media content label; namely, the heat degree of the media content label=(the total amount of the media contents containing the media content label in the media content library/the amount of all the media contents in the media content library);

2) calculating a ratio between the total scores of the media contents containing the media content label and the heat degree of the media content label in the media content library to obtain a score of the media content label; namely, the score of the media content label=(/(the total scores of the media contents containing the media content label)/(the heat degree of the media content label)).

In this embodiment, the way above can be used for calculating a score of each media content label in the media content library, which can make the score of each media content label has a higher credibility, thereby making the media content that will be recommended subsequently has a higher heat degree. In addition, the media content with a higher heat degree means that the media content is more popular, that is, the higher the heat degree of the media content is, the more popular the media content is.

Step S102: selecting a first threshold media content label as a candidate media content label in descending order of the scores.

In one embodiment of the present invention, the first threshold can be set according to the actual needs, which will not be restricted in the embodiment of the present invention. For example, when the first threshold is set to 5, according to the scores of the 8 media content labels, namely the theme, the mood, the rhythm, the melody, the scene, the timbre, the musical instrument and the genre, sorted in descending order, the first 5 media content labels with the highest scores can be selected as the candidate media content labels.

Step S103: finding out, according to the candidate media content label, a media content corresponding to the candidate media content label from the media content library.

In a practical application, the same media content label can be owned by multiple media contents. For example, the same timbre can be owned by multiple songs at the same time. Accordingly, after the step of selecting a first threshold media content label as a candidate media content label in the step S102, multiple media contents corresponding to the candidate media content label can be find out from the media content library in one embodiment of the present invention.

Step S104: selecting, according to the media content corresponding to the candidate media content label, a second threshold media content as a media content to be recommended corresponding to the candidate media content label in descending order of the amount of page views.

In one embodiment of the present invention, the second threshold can be set according to the actual needs, which will not be restricted in the embodiment of the present invention. For example, when the first threshold is set to 5, and the second threshold is set to 20, for each of the 5 candidate media content labels, 20 media contents can be selected as the media contents to be recommended corresponding to the candidate media content label in descending order of the amount of page views.

In one embodiment of the present invention, the amount of page views of the media content can be understood as the number of audiences of the media content, or can also be understood as the number of clicks of the media content.

Step S105: recommending the media content to be recommended corresponding to the candidate media content label to a user.

For example, when the first threshold is set to 5, and the second threshold is set to 20, for the media contents corresponding to each of the candidate media content labels, 20 media contents can be selected as the media contents to be recommended corresponding to the candidate media content label by executing the step S104. Then the media contents to be recommended corresponding to each of the candidate media content labels can be recommended to the user by executing the step S105, namely, 100 media contents to be recommended can be recommended to the user.

In an optional embodiment, before the step S102 in one embodiment of the present invention, the media content labels can be sorted in descending order of the scores, then the step S102 is performed, which will not be restricted in the embodiment of the present invention. By use of the sort order, it is more convenient to select the first threshold media content labels as the candidate media content labels in the step S102.

In an optional embodiment, before the step S104 in one embodiment of the present invention, the media contents which have been browsed or pushed can be filtered out from the media contents corresponding to the candidate media content labels, and the rest of the media contents corresponding to the candidate media content labels can be sorted in descending order of the amount of page views, then the step S104 is performed, which will not be restricted in the embodiment of the present invention. By the way of firstly filtering out one part of media contents and then sorting the rest of the media contents, not only the media contents which have been browsed or pushed can be avoided being recommended to the user again and reducing the user experience, but also the step of selecting a second threshold media content as a media content to be recommended corresponding to the candidate media content label is performed more conveniently in the step S104.

In an optional embodiment, the step 105 may specifically be implemented by the following sub-steps:

1) sorting the media contents to be recommended corresponding to each of the candidate media content labels in descending order of the amount of page views;

2) considering the media contents to be recommended which have been sorted corresponding to each of the candidate media content labels as a whole, and recommending the media contents to be recommended corresponding to each of the candidate media content labels to the user after sorting the candidate media content labels in descending order of the scores.

In this embodiment, through the way of two sorts, it can be ensured that the most popular media contents corresponding to the most popular media content labels can be recommended to the user firstly, thereby further improving the user experience.

In the method as shown in FIG. 1, after calculating scores of the media content labels in the media content library, a first threshold media content label can be selected as a candidate media content label in descending order of the scores, then the media contents corresponding to the candidate media content label can be found out from the media content library, and then a second threshold media content can be further selected as the media content to be recommended corresponding to the candidate media content label in descending order of the amount of page views, and the media content to be recommended corresponding to the candidate media content label can be recommended to a user. By this way, the method can improve the accuracy of recommending popular media content to a user, and effectively reduce the style difference between the media contents that are recommended to the user, thereby avoiding unpopular media contents being recommended to the user.

Figure 2:
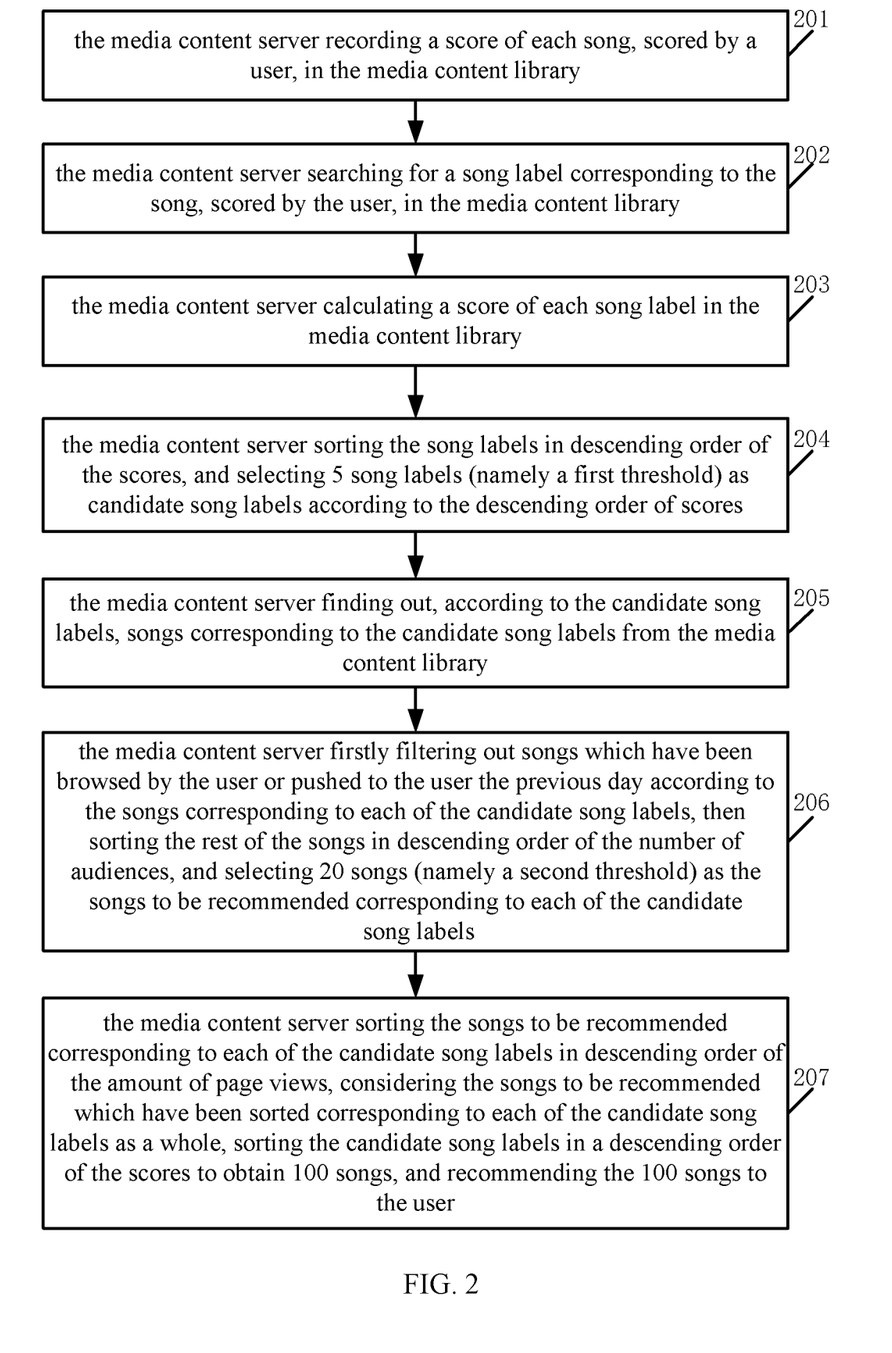
FIG. 2 is a flowchart of a method for recommendation of media content disclosed by another embodiment of the present invention.

Referring to FIG. 2, it is a flowchart of a method for recommendation of media content disclosed by another embodiment of the present invention. In the method as shown in FIG. 2, it is assumed that media contents in a media content library are the songs, and the method for recommendation of media content can be performed by a media content server in embodiments of the present invention. As shown in FIG. 2, the method for recommendation of media content may include the following steps.

Step S201: the media content server recording a score of each song, scored by a user, in the media content library.

Step S202: the media content server searching for a song label corresponding to the song, scored by the user, in the media content library.

Step S203: the media content server calculating a score of each song label in the media content library.

In an optional embodiment, the step S203 may specifically be implemented by the following sub-steps:

1) calculating, according to each song label in the media content library, a ratio between the total number of songs containing the song label and the amount of all songs in the media content library to obtain a heat degree of the song label; that is, the heat degree of the song label=(the total number of the songs containing the song label in the media content library/the amount of all the songs in the media content library);

2) calculating a ratio between the total scores of the songs containing the song label and the heat degree of the song label in the media content library to obtain a score of the song label; that is, the score of the song label=(/(the total scores of the songs containing the song label)/(the heat degree of the song label)).

In this embodiment, the way above can be used for calculating a score of each song label in the media content library, which can make the score of each song label has a higher credibility, thereby making the songs that will be recommended subsequently have a higher heat degree.

Step S204: the media content server sorting the song labels in descending order of the scores, and selecting 5 song labels (namely a first threshold) as candidate song labels according to the descending order of scores.

For example, the media content server may select 5 song labels (namely the first threshold) including: melody, scene, timbre, musical instrument and genre as the candidate song labels in descending order of the scores.

Step S205: the media content server finding out, according to the candidate song labels, songs corresponding to the candidate song labels from the media content library.

In this embodiment, the songs corresponding to each of the candidate song labels may be up to dozens or even hundreds.

Step S206: the media content server firstly filtering out songs which have been browsed by the user or pushed to the user the previous day according to the songs corresponding to each of the candidate song labels, then sorting the rest of the songs in descending order of the number of audiences, and selecting 20 songs (namely a second threshold) as the songs to be recommended corresponding to each of the candidate song labels.

In one embodiment of the present invention, for the songs which have been browsed, the media content server not only records a corresponding relationship between a song identification (ID) and a user ID (such as an account number), but also records the time that the songs are recommended to the user. Therefore, the media content server can easily determine the songs which have been browsed by the user or pushed to the user the previous day, and then the media server can further filter out the songs which have been browsed by the user or pushed to the user the previous day from all the songs.

Step S207: the media content server sorting the songs to be recommended corresponding to each of the candidate song labels in descending order of the amount of page views, considering the songs to be recommended which have been sorted corresponding to each of the candidate song labels as a whole, sorting the candidate song labels in a descending order of the scores to obtain 100 songs, and recommending the 100 songs to the user.

In the method as shown in FIG. 2, after calculating score of each of the song labels in the media content library, 5 song labels can be selected as candidate song labels in descending order of the scores, the songs corresponding to each of the candidate song labels can be found out from the media content library; furthermore, 20 songs can be selected as the songs to be recommended corresponding to each candidate song label in descending order of the number of audiences, and the songs to be recommended corresponding to the candidate song labels can be recommended to the user. By this way, popular media contents can be recommended to a user, and style difference between the media contents that are recommended to the user can be reduced effectively, thereby avoiding unpopular media content being recommended to the user.

Figure 3:
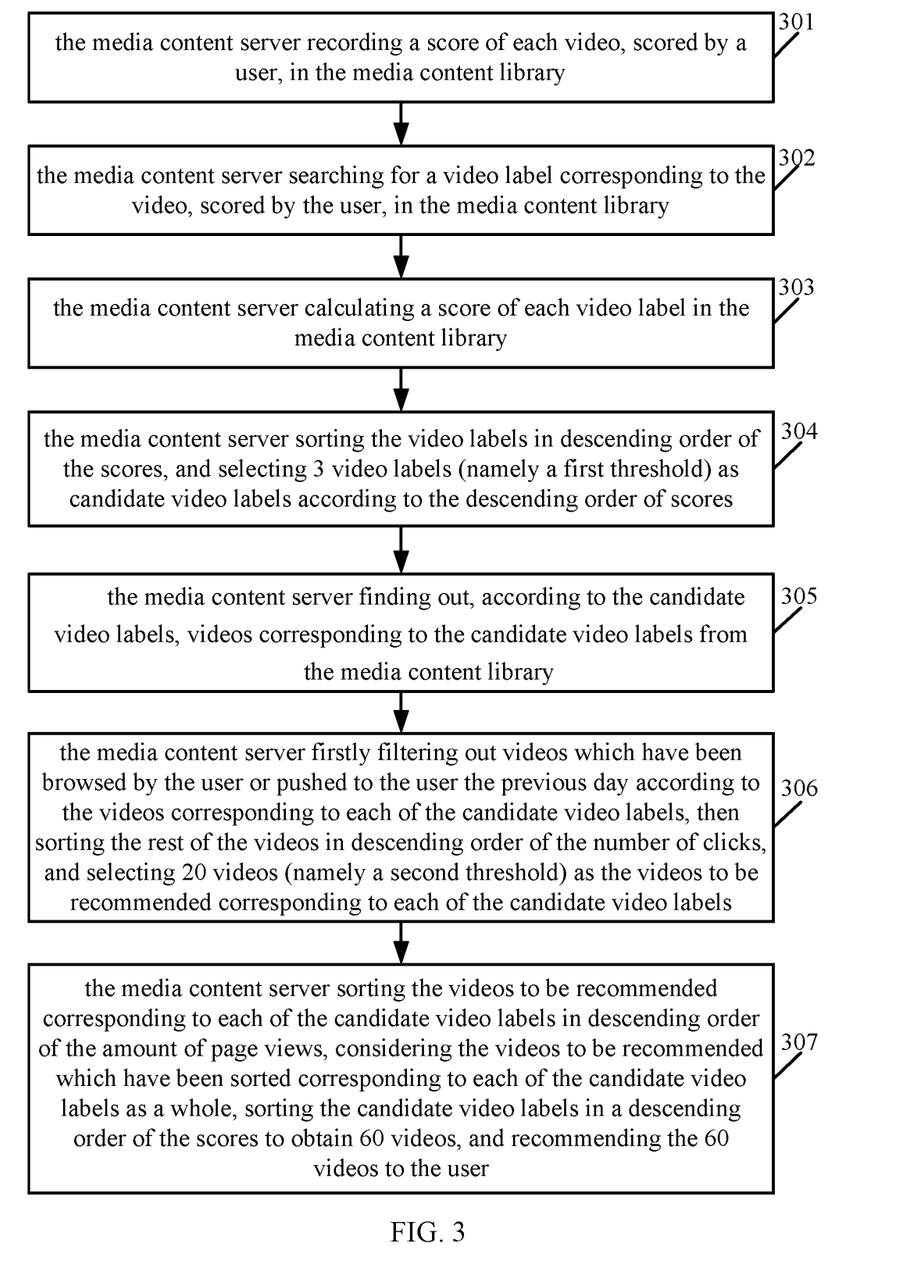
FIG. 3 is a flowchart of a method for recommendation of media content disclosed by yet another embodiment of the present invention.

Referring to FIG. 3, it is a flowchart of a method for recommendation of media content disclosed by another embodiment of the present invention. In the method as shown in FIG. 3, assuming that the media contents in the media content library are the videos, and the method for recommendation of media content can be performed by a media content server in embodiments of the present invention. As shown in FIG. 3, the method for recommendation of media content may include the following steps.

Step S301: the media content server recording a score of each video, scored by a user, in the media content library.

Step S302: the media content server searching for a video label corresponding to the video, scored by the user, in the media content library.

Step S303: the media content server calculating a score of each video label in the media content library.

In an optional embodiment, the step S303 may specifically be implemented by the following sub-steps:

1) calculating, according to each video label in the media content library, a ratio between the total number of videos containing the video label and the amount of all videos in the media content library to obtain a heat degree of the video label; that is, the heat degree of the video label=(the total number of the videos containing the video label in the media content library/the amount of all the videos in the media content library);

2) calculating a ratio between the total scores of the videos containing the video label and the heat degree of the video label in the media content library to obtain a score of the video label; that is, the score of the video label=(/(the total scores of the videos containing the video label)/(the heat degree of the video label)).

In this embodiment, the way above can be used for calculating a score of each video label in the media content library, which can make the score of each video label has a higher credibility, thereby making the videos that will be recommended subsequently have a higher heat degree.

Step S304: the media content server sorting the video labels in descending order of the scores, and selecting 3 video labels (namely a first threshold) as candidate video labels according to the descending order of scores.

For example, the media content server may select 3 video labels (namely the first threshold) including: theme, mood and genre as the candidate video labels in descending order of the scores.

Step S305: the media content server finding out, according to the candidate video labels, videos corresponding to the candidate video labels from the media content library.

In this embodiment, the videos corresponding to each of the candidate video labels may be up to dozens or even hundreds.

Step S306: the media content server firstly filtering out videos which have been browsed by the user or pushed to the user the previous day according to the videos corresponding to each of the candidate video labels, then sorting the rest of the videos in descending order of the number of clicks, and selecting 20 videos (namely a second threshold) as the videos to be recommended corresponding to each of the candidate video labels.

In one embodiment of the present invention, for the videos which have been browsed, the media content server not only records a corresponding relationship between a video identification (ID) and a user ID (such as a registered user account), but also records the time that the videos are recommended to the user. Therefore, the media content server can easily determine the video which have been browsed by the user or pushed to the user the previous day, and then the media server can further filter out the videos which have been browsed by the user or pushed to the user the previous day.

Step S307: the media content server sorting the videos to be recommended corresponding to each of the candidate video labels in descending order of the amount of page views, considering the videos to be recommended which have been sorted corresponding to each of the candidate video labels as a whole, sorting the candidate video labels in a descending order of the scores to obtain 60 videos, and recommending the 60 videos to the user.

In the method as shown in FIG. 3, after calculating scores of each of the video labels in the media content library, 3 video labels can be selected as candidate video labels in descending order of the scores, the videos corresponding to each of the candidate video labels can be found out from the media content library; furthermore, 20 videos with the highest number of clicks can be selected as the videos to be recommended corresponding to each candidate video label in descending order of the number of clicks, and the videos to be recommended corresponding to the candidate video label can be recommended to the user. By this way, style difference between the videos that are recommended to the user can be effectively reduced, and unpopular videos can be avoided being recommended to the user, thereby improving the experience of the user.

Figure 4:
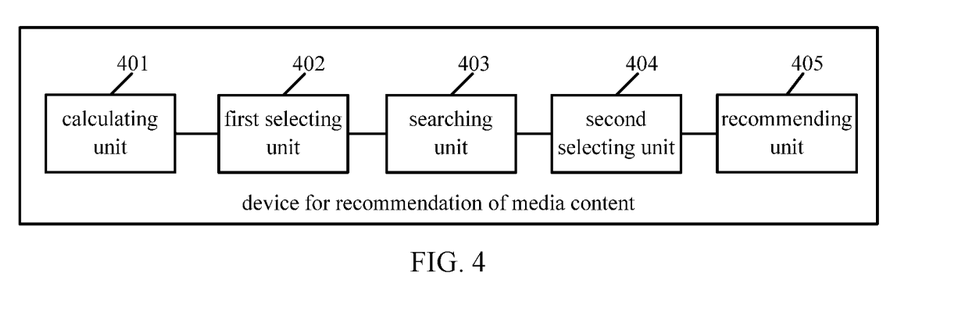
FIG. 4 is a structure diagram of a device for recommendation of media content disclosed by one embodiment of the present invention.

Referring to FIG. 4, it is a structure diagram of a device for recommendation of media content disclosed by one embodiment of the present invention. The device for recommendation of media content as shown in FIG. 4, on the physical implementation, can be a media content server, or other intelligence platforms that have the ability to recommend media contents, which will not be restricted in embodiment of the present invention. As shown in FIG. 4, the device for recommendation of media content may at least include a calculating unit 401, a first selecting unit 402, a searching unit 403, a second selecting unit 404, and a recommending unit 405.

The calculating unit 401 is configured to calculate a score of a media content label in the media content library.

In one embodiment, the media contents in the media content library may be any one of songs, videos, audios, images and texts, or a combination of two or more than two of the songs, the videos, the audios, the images and the texts.

In one embodiment, there may at least include 8 media content labels: namely, theme, mood, rhythm, melody, scene, timbre, musical instrument and genre. In other words, the scores of the theme, the mood, the rhythm, the melody, the scene, the timbre, the musical instrument and the genre in the media content can be calculated separately by the calculating unit 401.

The first selecting unit 402 is configured to select a first threshold media content label as a candidate media content label in descending order of the scores.

The searching unit 403 is configured to find out, according to the candidate media content label, a media content corresponding to the candidate media content label from the media content library.

The second selecting unit 404 is configured to select, according to the media content corresponding to the candidate media content label, a second threshold media content as a media content to be recommended corresponding to the candidate media content label in descending order of the amount of page views.

The recommending unit 405 is configured to recommend the media content to be recommended corresponding to the candidate media content label to a user.

Figure 5:
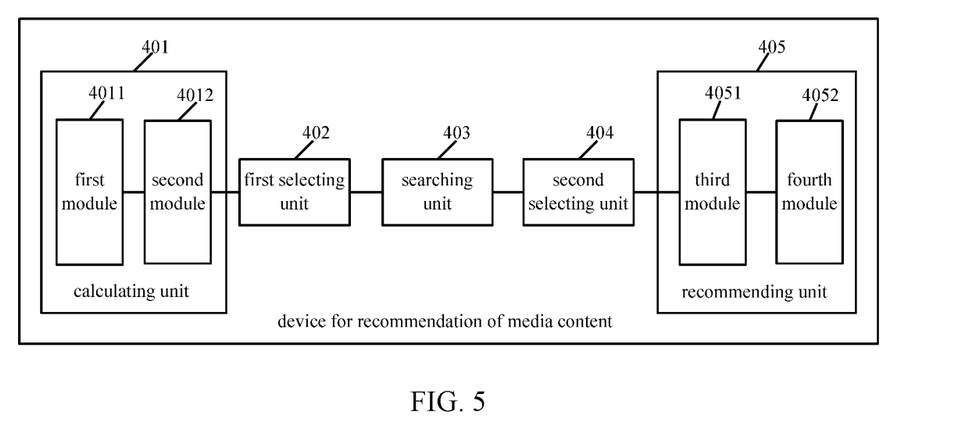
FIG. 5 is a structure diagram of a device for recommendation of media content disclosed by another embodiment of the present invention.

Referring to FIG. 5 together, it is a structure diagram of a device for recommendation of media content disclosed by another embodiment of the present invention. The device for recommendation of media content shown in FIG. 5 is obtained by optimizing the device for recommendation of media content shown in FIG. 4.

In an optional embodiment, as the device for recommendation of media content shown in FIG. 5, the calculating unit 401 may include the following sub-modules: a first module 4011, which is configured to calculate, according to the media content label in the media content library, a ratio between the total amount of media contents containing the media content label and the amount of all media contents in the media content library to obtain a heat degree of the media content label; and a second module 4012, which is configured to calculate a ratio between the total scores of the media content containing the media content label and the heat degree of the media content label in the media content library to obtain a score of the media content label, and provide the score for the first selecting unit 402.

In an optional embodiment, as the device for recommendation of media content shown in FIG. 5, the recommending unit 405 may include the following sub-modules: a third module 4051, which is configured to sort the media contents to be recommended corresponding to each of the candidate media content labels in descending order of the amount of page views; and a fourth module 4052, which is configured to consider the media contents to be recommended which have been sorted corresponding to each of the candidate media content labels as a whole, and recommend the media contents to be recommended corresponding to each of the candidate media content labels to the user after sorting the candidate media content labels in descending order of the scores.

In an optional embodiment, as the device for recommendation of media content shown in FIG. 4 and FIG. 5, the first selecting unit 402 is further configured to sort the media content labels in descending order of the scores before selecting the first threshold media content label as the candidate media content label in descending order of the scores.

In an optional embodiment, as the device for recommendation of media content shown in FIG. 4 and FIG. 5, the second selecting unit 404 is further configured to filter out the media contents which have been browsed or pushed from the media content corresponding to the candidate media content label, and sort the rest of the media contents corresponding to the candidate media content label in descending order of the amount of page views before selecting, according to the media content corresponding to the candidate media content label, the second threshold media content as the media content to be recommended corresponding to the candidate media content label in descending order of the amount of page views.

It is obvious that the device for recommendation of media content shown in FIG. 4 and FIG. 5 can recommend some media contents what are popular and satisfy user's taste, effectively reduce the style difference between the media contents that are recommended to the user, and avoid the unpopular media contents, thereby greatly improving the user experience.

According to one embodiment of the present invention, the method for recommendation of media content shown in FIG. 1 can be performed by the units of the device for recommendation of media content shown in FIG. 4. For example, the step S101 to S105 shown in FIG. 1 can be performed by the calculating unit 401, the first selecting unit 402, the searching unit 403, the second selecting unit 404, and the recommending unit 405 shown in FIG. 4.

According to another embodiment of the present invention, some or all of the units in the device for recommendation of media content shown in FIG. 4 can be formed by merging into one or several additional units. In addition, wherein the one unit (or several units) may be further formed by splitting into several smaller functional units. Including but not limited, the calculation unit 401 can be implemented by the first module 4011 and the second module 4012, and the recommending unit 405 can be implemented by the third module 4051 and the fourth module 4052, through which the same operation can be achieved without affecting to achieve the technical effect of embodiments of the present invention.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The foregoing descriptions are merely embodiments of the present invention, but not intended to limit the protection scope of the present invention. Any variation or replacement made by persons of ordinary skills in the art without departing from the spirit of the present invention shall fall within the protection scope of the present invention. Therefore, the scope of the present invention shall be subject to be appended claims.

What is claimed is:

1. A computer-implemented method for recommending media items stored in a media content library to a user, the method comprising:
   at a computing device having one or more processors and memory storing program modules to be executed by the processors:

assigning a plurality of labels to the media items, each label corresponding to a respective one of the media items;
for each of the plurality of labels,
  computing a label score for the label based on a first ratio of a count of media items stored in the media content library having the label and a count of media items stored in the media content library and a second ratio between a total amount of user-assigned scores of the media items having the label and the first ratio;
  identifying, within the media content library, a first plurality of media items having the label;
  excluding, from the first plurality of media items having the label, media items that have been made accessible to the user during a predefined time period to obtain a second plurality of media items having the label;
  ranking the second plurality of media items having the label in accordance with their respective user-assigned scores; and
  selecting, based on the ranking, a predetermined number of recommended media items having highest user-assigned scores to be recommended to the user;
selecting a first subset of labels having highest label scores from the plurality of labels in accordance with their respective label scores;
identifying, within the media content library, a list of recommended media items corresponding to the first subset of labels;
sorting the list of recommended media items in a descending order based on their respective user scores and corresponding label scores; and
pushing the sorted list to a user terminal associated with the user.

2. The method of claim 1, wherein the label is selected from the group consisting of: theme, mood, rhythm, melody, scene, timbre, musical instrument and genre.

3. The method of claim 1, wherein each of the plurality of media items in the media content library has a plurality of scores provided by a plurality of users that have browsed the media item.

4. The method of claim 1, wherein each of the plurality of media items in the media content library comprises any one or more of a song, a video, an audio, an image and a text.

5. A computing device for recommending media items stored in a media content library to a user, comprising:
one or more processors;
memory; and
one or more program modules stored in the memory and to be executed by the processors, the one or more program modules further comprising instructions for:
  assigning a plurality of labels to the media items, each label corresponding to a respective one of the media items;
  for each of the plurality of labels,
    computing a label score for the label based on a first ratio of a count of media items stored in the media content library having the label and a count of media items stored in the media content library and a second ratio between a total amount of user-assigned scores of the media items having the label and the first ratio;
    identifying, within the media content library, a first plurality of media items having the label;
    excluding, from the first plurality of media items having the label, media items that have been made accessible to the user during a predefined time period to obtain a second plurality of media items having the label;
    ranking the second plurality of media items having the label in accordance with their respective user-assigned scores; and
    selecting, based on the ranking, a predetermined number of recommended media items having highest user-assigned scores to be recommended to the user;
  selecting a first subset of labels having highest label scores from the plurality of labels in accordance with their respective label scores;
  identifying, within the media content library, a list of recommended media items corresponding to the first subset of labels;
  sorting the list of recommended media items in a descending order based on their respective user scores and corresponding label scores; and
  pushing the sorted list to a user terminal associated with the user.

6. The computing device of claim 5, wherein the label is selected from the group consisting of: theme, mood, rhythm, melody, scene, timbre, musical instrument and genre.

7. The computing device of claim 5, wherein each of the plurality of media items in the media content library has a plurality of scores provided by a plurality of users that have browsed the media item.

8. The computing device of claim 5, wherein each of the plurality of media items in the media content library comprises any one or more of a song, a video, an audio, an image and a text.

9. A non-transitory computer readable storage medium for recommending media items stored in a media content library to a user, the non-transitory computer readable storage medium storing one or more program modules that, when executed by a computing device, cause the computing device to perform a plurality of operations including:
assigning a plurality of labels to the media items, each label corresponding to a respective one of the media items;
for each of the plurality of labels,
  computing a label score for the label based on a first ratio of a count of media items stored in the media content library having the label and a count of media items stored in the media content library and a second ratio between a total amount of user-assigned scores of the media items having the label and the first ratio;
  identifying, within the media content library, a first plurality of media items having the label;
  excluding, from the first plurality of media items having the label, media items that have been made accessible to the user during a predefined time period to obtain a second plurality of media items having the label;
  ranking the second plurality of media items having the label in accordance with their respective user-assigned scores; and
  selecting, based on the ranking, a predetermined number of recommended media items having highest user-assigned scores to be recommended to the user;
selecting a first subset of labels having highest label scores from the plurality of labels in accordance with their respective label scores;

identifying, within the media content library, a list of recommended media items corresponding to the first subset of labels;

sorting the list of recommended media items in a descending order based on their respective user scores and corresponding label scores; and pushing the sorted list to a user terminal associated with the user.

10. The non-transitory computer readable storage medium of claim 9, wherein the label is selected from the group consisting of: theme, mood, rhythm, melody, scene, timbre, musical instrument and genre.

11. The non-transitory computer readable storage medium of claim 9, wherein each of the plurality of media items in the media content library has a plurality of scores provided by a plurality of users that have browsed the media item.

12. The non-transitory computer readable storage medium of claim 9, wherein each of the plurality of media items in the media content library comprises any one or more of a song, a video, an audio, an image and a text.

* * * * *